(12) United States Patent
Luo et al.

(10) Patent No.: US 9,219,566 B2
(45) Date of Patent: Dec. 22, 2015

(54) WAVELENGTH MANAGEMENT IN MULTIPLE-WAVELENGTH PASSIVE OPTICAL NETWORKS

(75) Inventors: Yuanqiu Luo, Cranbury, NJ (US); Frank J. Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 118 days.

(21) Appl. No.: 13/440,842

(22) Filed: Apr. 5, 2012

(65) Prior Publication Data

US 2013/0094862 A1 Apr. 18, 2013

Related U.S. Application Data

(60) Provisional application No. 61/473,442, filed on Apr. 8, 2011.

(51) Int. Cl.
*H04J 14/00* (2006.01)
*H04B 10/20* (2006.01)
(Continued)

(52) U.S. Cl.
CPC ........... *H04J 14/0278* (2013.01); *H04J 14/025* (2013.01); *H04J 14/0246* (2013.01);
(Continued)

(58) Field of Classification Search
CPC .............. H04J 14/0282; H04J 14/0232; H04J 14/0238; H04J 14/0267; H04J 14/025; H04J 14/0252
USPC ........................ 398/57–72, 79, 140, 153, 165
See application file for complete search history.

(56) References Cited

U.S. PATENT DOCUMENTS 7,092,595 B2    8/2006  Sorin et al.
2003/0099243 A1  5/2003  Oh et al.
(Continued)

FOREIGN PATENT DOCUMENTS

CA    2763095 A1 * 12/2010
CN    1925370 A    3/2007
(Continued)

OTHER PUBLICATIONS

Foreign Communication From a Related Counterpart Application, PCT Application PCT/CN2012/073659, International Search Report dated Jul. 19, 2012, 3 pages.
(Continued)

*Primary Examiner* — David Payne
*Assistant Examiner* — Pranesh Barua
(74) *Attorney, Agent, or Firm* — Conley Rose, P.C.; Grant Rodolph; Brandt D. Howell

(57) ABSTRACT

A system for supporting wavelength management in a passive optical network (PON), comprising an optical line terminal (OLT) configured to send an wavelength assignment for optical network unit (ONU) communications based on a wavelength tunability capability, and an ONU coupled to the OLT and configured to send the wavelength tunability capability to the OLT, wherein the wavelength assignment and the wavelength tunability capability are sent in media access control (MAC) messages. Also disclosed is an apparatus of an OLT for supporting wavelength management, comprising one or more component configured to couple to an ONU and exchange a wavelength assignment for transmission with the ONU based on a wavelength tunability of the ONU, wherein the wavelength indication and the wavelength tunability are exchanged via MAC layer frames.

9 Claims, 11 Drawing Sheets

(51) Int. Cl.
*H04J 14/06* (2006.01)
*H04J 14/02* (2006.01)

(52) U.S. Cl.
CPC ......... *H04J 14/0257* (2013.01); *H04J 14/0258* (2013.01); *H04J 14/0267* (2013.01); *H04J 14/0273* (2013.01); *H04J 14/0282* (2013.01); *H04Q 2213/1301* (2013.01)

(56) References Cited

U.S. PATENT DOCUMENTS

| | | | |
|---|---|---|---|
| 2004/0249976 | A1 | 12/2004 | Neustadter et al. |
| 2007/0092256 | A1* | 4/2007 | Nozue et al. ................ 398/72 |
| 2007/0166037 | A1* | 7/2007 | Palacharla et al. .......... 398/72 |
| 2008/0138072 | A1 | 6/2008 | Sakamoto et al. |
| 2008/0166127 | A1* | 7/2008 | Kazawa et al. .............. 398/79 |
| 2008/0253769 | A1* | 10/2008 | Liu ............................... 398/58 |
| 2008/0267627 | A1 | 10/2008 | Effenberger |
| 2008/0273877 | A1* | 11/2008 | Palacharla et al. .......... 398/64 |
| 2009/0067838 | A1* | 3/2009 | Chen et al. ................... 398/58 |
| 2009/0110400 | A1* | 4/2009 | Nozue et al. ................. 398/71 |
| 2009/0162053 | A1* | 6/2009 | Ikeda et al. .................. 398/25 |
| 2009/0263130 | A1 | 10/2009 | Luo et al. |
| 2010/0178051 | A1* | 7/2010 | Mizutani et al. ............. 398/25 |
| 2010/0221007 | A1* | 9/2010 | Sakamoto et al. ........... 398/67 |
| 2011/0236017 | A1* | 9/2011 | Ohlen ........................... 398/34 |
| 2012/0093509 | A1 | 4/2012 | Kazawa et al. |
| 2012/0093512 | A1* | 4/2012 | Lee et al. ..................... 398/66 |
| 2012/0099861 | A1* | 4/2012 | Zheng .......................... 398/45 |
| 2012/0128358 | A1* | 5/2012 | Zhang et al. ................. 398/63 |
| 2012/0251115 | A1* | 10/2012 | Sarashina et al. ........... 398/72 |
| 2013/0045005 | A1* | 2/2013 | Nakura et al. ............... 398/25 |

FOREIGN PATENT DOCUMENTS

| | | | |
|---|---|---|---|
| CN | 101222279 | A | 7/2008 |
| CN | 101467366 | A | 6/2009 |
| CN | 101621452 | A | 1/2010 |
| CN | 101621723 | A | 1/2010 |
| CN | 101742365 | * | 6/2010 |
| CN | 101742365 | A | 6/2010 |
| WO | 2010146658 | A1 | 12/2010 |

OTHER PUBLICATIONS

Foreign Communication From a Related Counterpart Application, PCT Application PCT/CN2012/073659, Written Opinion dated Jul. 19, 2012, 8 pages.
Foreign Communication From a Related Counterpart Application, PCT Application PCT/CN2012/073662, International Search Report dated Jul. 26, 2012, 7 pages.
Foreign Communication From a Related Counterpart Application, PCT Application PCT/CN2012/073662, Written Opinion dated Jul. 26, 2012, 5 pages.
McGarry, M., et al., "WDM Ethernet Passive Optical Networks," IEEE Optical Communications, vol. 44, No. 2, XP-001240359, Feb. 1, 2006, pp. S18-S25.
Zhang, J., et al., "Design of WDM PON with Tunable Lasers: The Upstream Scenario," Journal of Lightwave Technology, vol. 28, No. 2, XP11298610, Jan. 15, 2010, pp. 228-236.
Han, K., et al., "An AWG-based WMD-PON Architecture Employing WDM/TDMA Transmission for Upstream Traffic with Dynamic Bandwidth Allocation," Photon Netw Common, 15:191-202, Nov. 2, 2006, pp. 191-202.
McGarry, M., P., et al., "An Evolutionary WDM Upgrade for EPONs," Retrieved on Apr. 29, 2014, from the Internet: URL:http://mre.faculty.asu.edu/EPONupgrade.pdf, XP055115813, Jan. 1, 2005, 24 pages.
Foreign Communication From a Counterpart Application, European Application No. 12767256.6, Extended European Search Report dated May 14, 2014, 7 pages.
Martinelli, G., Ed., et al., "GMPLS Signaling Extensions for Optical Impairment Aware Lightpath Setup," draft-martinelli-ccamp-optical-imp-signaling-01.txt, Feb. 22, 2008, 20 pages.
Lam, C., et al., "Passive Optical Networks: Principles and Practice," Elsevier, Inc., 2007, pp. 311-313.
"Series G: Transmission Systems and Media, Digital Systems and Digital Line System—Optical Line Systems for Local and Access Networks, 10-Gigabit-capable Passive Optical Networks (XG-PON): Transmission Convergence (TC) layer Specification," ITU-T, Telecommunication Standardization Sector of ITU, G.987.3, Oct. 2010, 134 pages.
Foreign Communication From a Counterpart Application, European Application No. 12767609.6, Extended European Search Report dated Apr. 25, 2014, 8 pages.
Office Action dated Nov. 12, 2013, 36 pages, U.S. Appl. No. 13/440,765, filed Apr. 5, 2012.
Office Action dated May 21, 2014, 36 pages, U.S. Appl. No. 13/440,765, filed Apr. 5, 2012.

* cited by examiner

| Octet | Content |
|---|---|
| 1-2 | Unassigned ONU-ID or assigned ONU-ID |
| 3 | Message type ID |
| 4 | Sequence number |
| 5~w | ONU Tx wavelength |
| (w+1)~x | ONU Rx wavelength |
| (x+1)~y | ONU Tx tunability |
| (y+1)~z | ONU Rx tunability |
| (z+1)~40 | Reserved or padding |
| 41-48 | Message integrity check |

400

| Octet | Content |
|---|---|
| 1-2 | Unassigned ONU-ID |
| 3 | Message type ID |
| 4 | Sequence number |
| 5~8 | Vendor_ID |
| 9~12 | Vendor-specific serial number |
| 13~16 | Random_delay |
| 17~w | ONU Tx wavelength |
| (w+1)~x | ONU Rx wavelength |
| (x+1)~y | ONU Tx tunability |
| (y+1)~z | ONU Rx tunability |
| (z+1)~40 | Reserved or padding |
| 41~48 | Message integrity check |

| Octet | Content |
|---|---|
| 1-2 | Assigned ONU-ID |
| 3 | Message type ID |
| 4 | Sequence number |
| 5~a | ONU Tx wavelength |
| (a+1)~b | ONU Rx wavelength |
| (b+1)~40 | Reserved or padding |
| 41-48 | Message integrity check |

| Octet | Content |
|---|---|
| 1-2 | Broadcast ONU-ID |
| 3 | Message type ID |
| 4 | Sequence number |
| 5~6 | ONU-ID |
| 7~10 | Vendor-ID |
| 11~14 | Vendor-specific serial number (VSSN) |
| 15~a | ONU Tx wavelength |
| (a+1)~b | ONU Rx wavelength |
| (b+1)~40 | Reserved or padding |
| 41~48 | Message integrity check |

| Octet | Content |
|---|---|
| 1-2 | Assigned ONU-ID |
| 3 | Message type ID |
| 4 | Sequence number |
| 5~a | ONU Tx wavelength |
| (a+1)~b | ONU Rx wavelength |
| (b+1)~40 | Reserved or padding |
| 41-48 | Message integrity check |

| Octet | Content |
|---|---|
| 1-2 | Assigned ONU-ID |
| 3 | Message type ID |
| 4 | Sequence number |
| 5~a | Registration_ID |
| (a+1)~b | ONU Tx wavelength |
| (b+1)~40 | ONU Rx wavelength |
| 41-48 | Message integrity check |

| Octet | Content |
|---|---|
| 1-2 | Assigned ONU-ID |
| 3 | Message type ID |
| 4 | Sequence number |
| 5 | Completion_code |
| 6~a | ONU Tx wavelength |
| (a+1)~b | ONU Rx wavelength |
| (b+1)~40 | Reserved or padding |
| 41-48 | Message integrity check |

FIG. 9

| Octet | Content |
|---|---|
| 1-2 | Assigned ONU-ID |
| 3 | Message type ID |
| 4 | Sequence number |
| 5~40 | Reserved or padding |
| 41-48 | Message integrity check |

1300

| Octet | Content |
|---|---|
| 1-2 | Assigned ONU-ID |
| 3 | Message type ID |
| 4 | Sequence number |
| 5~a | Wavelength request indication |
| (a+1)~40 | Reserved or padding |
| 41-48 | Message integrity check |

| Attribute | Content |
|---|---|
| Working upstream frequency | This attribute specifies the frequency of the upstream signal transmitted by the ONU, in GHz. (R, W) (optional) (4 bytes). |
| Working downstream frequency | This attribute specifies the frequency of the downstream signal received by the ONU, in GHz. (R, W) (optional) (4 bytes) |
| Workable upstream frequencies | This attribute specifies the frequencies of the upstream signals which can be transmitted by the ONU, in GHz. |
| Workable downstream frequencies | This attribute specifies the frequencies of the downstream signals which can be received by the ONU, in GHz. |

FIG. 14

| Attribute | Content |
|---|---|
| Target upstream frequency | This attribute specifies the frequency of the converted upstream signal transmitted by the ONU, in GHz. (R, W) (optional) (4 bytes). |
| Target downstream frequency | This attribute specifies the frequency of the converted downstream signal received by the ONU, in GHz. (R, W) (optional) (4 bytes) |

WAVELENGTH MANAGEMENT IN MULTIPLE-WAVELENGTH PASSIVE OPTICAL NETWORKS

CROSS-REFERENCE TO RELATED APPLICATIONS

The present application claims the benefit of U.S. Provisional Patent Application No. 61/473,442 filed Apr. 8, 2011 by Yuanqiu Luo, et al. and entitled "Wavelength Management in Multiple-Wavelength Passive Optical Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 gigabits per second (Gbps) while upstream data is transmitted at about 1.25 Gbps. However, the bandwidth capability of the PON systems is expected to increase as the demands for services increase. To meet the increased demand in services, some emerging PON systems, such as Next Generation Access (NGA) systems, are being reconfigured to transport the data frames with improved reliability and efficiency at higher bandwidths, for example at about ten Gbps.

SUMMARY

In one embodiment, the disclosure includes a system for supporting wavelength management in a PON, comprising an OLT configured to send an wavelength assignment for ONU communications based on a wavelength tunability capability, and an ONU coupled to the OLT and configured to send the wavelength tunability capability to the OLT, wherein the wavelength assignment and the wavelength tunability capability are sent in media access control (MAC) messages.

In another embodiment, the disclosure includes an apparatus of an OLT for supporting wavelength management, comprising one or more component configured to couple to an ONU and exchange a wavelength assignment for transmission with the ONU based on a wavelength tunability of the ONU, wherein the wavelength indication and the wavelength tunability are exchanged via MAC layer frames.

In yet another embodiment, the disclosure includes a method implemented at OLT to support wavelength management for a PON comprising receiving, using a receiver, a wavelength and tunability report from an ONU that comprises an ONU transmitter wavelength, an ONU receiver wavelength, an ONU transmitter tunability, and an ONU receiver tunability, and sending, using a transmitter, a wavelength assignment command to the ONU that indicates an assigned ONU transmitter wavelength and an assigned ONU receiver wavelength.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram of an embodiment of a Serial_Number_ONU PLOAM message.

FIG. 5 is a schematic diagram of an embodiment of a wavelength assignment PLOAM message.

FIG. 6 is a schematic diagram of an embodiment of an Assign_ONU-identifier (ID) PLOAM message.

FIG. 7 is a schematic diagram of an embodiment of a wavelength response PLOAM message.

FIG. 8 is a schematic diagram of an embodiment of a Registration PLOAM message.

FIG. 9 is a schematic diagram of an embodiment of an Acknowledge PLOAM message.

FIG. 13 is a schematic diagram of an embodiment of a Request_Registration PLOAM message.

FIG. 14 is a schematic diagram of an embodiment of management entity (ME) attributes for wavelength capability request and report.

DETAILED DESCRIPTION

Figure 1:
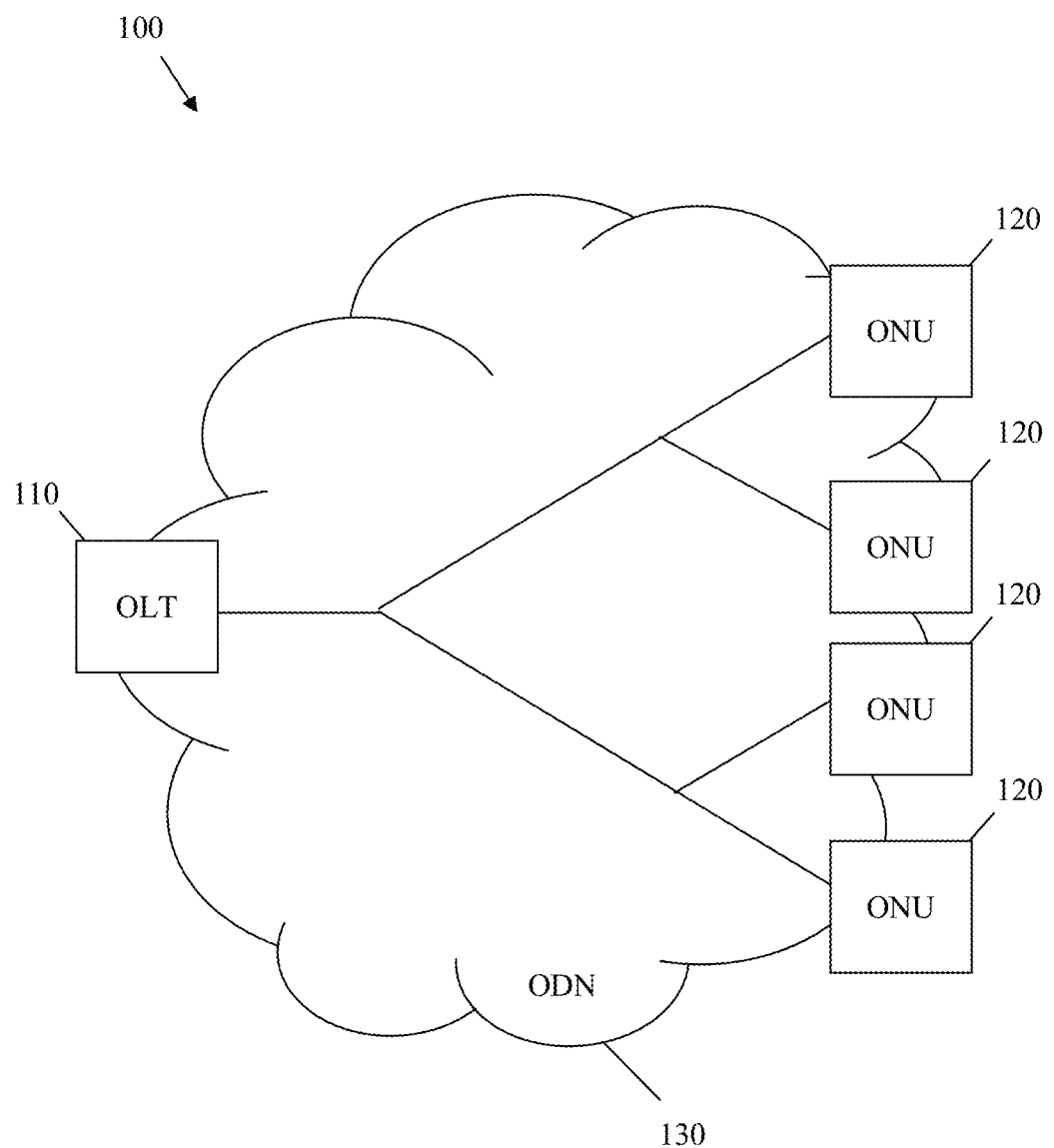
FIG. 1 is a schematic diagram of an embodiment of a PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Different PON systems that may support bit rates higher than about 10 Gbps have been proposed for next generation PON (NGPON) systems (also referred to as NGPON stage 2 or NGPON2). Some of these systems may be multiple-wavelength PON systems that transmit and/or receive data for a plurality of ONUs using a plurality of wavelengths (or wavelength channels). The multiple-wavelength systems may include wavelength-stacked GPON and 10 gigabit PON (XG-PON) systems (also referred to as XGPON stage 1 or XGPON1), splitter based or arrayed waveguide grating (AWG) based wavelength division multiplexing (WDM)-PON systems, dynamic spectrum management (DSM)-PON systems, coherent-PON systems, and orthogonal frequency division multiplexing (OFDM)-PON systems.

Multiple wavelengths may be employed in the systems above to provide higher access rates. Using the multiple wavelengths may enhance the capacity of the time domain multiplexing (TDM) PONs in the wavelength domain, e.g., using coarse WDM (CWDM) or dense WDM (DWDM) architectures and schemes. In a WDM-PON system, the ONUs may be connected to the network via different wavelengths. This may be enabled using wavelength tunability at the ONU or the OLT, slicing wavelengths via an AWG, coherent signal generation and detection, injection locking, or other schemes. The wavelength tunability may represent the tunable wavelength range of the ONU. In a DSM-PON system, legacy GPON or XGPON ONUs may be sub-grouped by the OLT based on the ONUs' working wavelength channels, and system capacity may be increased via intelligent super MAC functionalities in the OLT. Coherent-PON systems may be based on coherent signal processing. OFDM-PON systems may rely on multiple carrier modulation.

Depending on the application scenarios, the implementation of the NGPON system may also be a hybrid of the above systems. For example, coherent-WDM-PONs, WDM-TDM-PONs, OFDM-WDM-TDM-PONs are some of the systems that may be used to achieve a NGPON. This trend may represent a further enhancement of existing TDM-PON (GPON or XGPON) bandwidth, e.g., which allows the NGPON system to serve a larger number of ONUs at longer distances. Such enhancement from GPON and XGPON systems to NGPON may challenge existing protocols of GPON and XGPON, such as in term of a proper management mechanism that support multiple wavelengths. Protocol changes or improvements to support multiple-wavelength capability may include changes to the GPON and XGPON transmission convergence (TC) layer protocols, e.g., for TDM/TDM access (TDMA) management.

Disclosed herein are systems and methods for wavelength management in a multiple-wavelength PON system. The systems include mechanisms to manage the ONU's wavelength channels in ONU activation and in normal operation. The methods may comprise information exchange for wavelength management. The wavelength management mechanisms may be implemented for XGPON TC layer and other PON protocols. The wavelength management information may be exchanged via MAC layer frames, such as PLOAM messages.

FIG. 1 illustrates one embodiment of a PON 100. The PON 100 may comprise an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be NGA systems, such as XGPONs, which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the International Telecommunication Union Telecommunication Standardization Sector (ITU-T) G.983 standard, the GPON defined by the ITU-T G.984 standard, the EPON defined by the Institute of Electrical and Electronics Engineers (IEEE) 802.3ah standard, the 10GEPON as described in the IEEE 802.3av standard, and the Wavelength Division Multiplexed WDM-PON. Additionally, the PON 100 may also have multiple-wavelength capability, where multiple downstream and/or upstream wavelengths (or wavelength channels) may be used to carry data, such as for different ONUs 120 or customers. Accordingly, the PON protocol may be configured to support any of the multiple-wavelength technologies/systems described above.

The OLT 110 may be any device that is configured to communicate with the ONUs 120 and another network (not shown). The OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking (SONET)/Synchronous Digital Hierarchy (SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

The ONUs 120 may be any devices that are configured to communicate with the OLT 110 and a customer or user (not shown). The ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. The transmitters and receivers at different ONUs 120 may use different wavelengths to transmit and receive optical signals that carry data. The transmitter and receiver at the same ONU 120 may use the same wavelength or different wavelengths. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

The ODN 130 may be a data distribution system, which may comprise optical fiber cables, couplers, splitters, distributors, and/or other equipment. The optical fiber cables, couplers, splitters, distributors, and/or other equipment may be passive optical components that may not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

To support multiple-wavelength capability, the PON 100 may comprise one or more AWGs, such as at the ODN 130 and/or the OLT 110. The AWGs may be configured to combine/split multiple wavelength channels, which may be optical signals transmitted at different wavelengths, in the upstream/downstream directions. The PON 100 may also be configured to implement one or more methods for wavelength management to exchange wavelength management information between the OLT 110 and any of the ONUs 120. The exchanged information between the OLT 110 and the ONUs 130 may also include wavelength assignment information. The methods may enable information exchanges during an ONU's activation phase (e.g., when the ONU 120 registers with the OLT 110) or during the ONU's operations (e.g., after registration or activation).

Figures 2, 3:
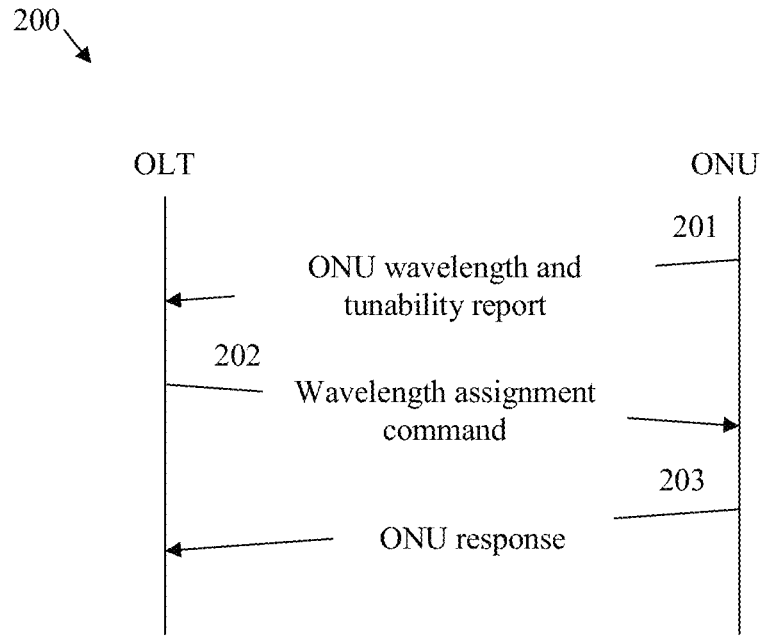
FIG. 2 is a protocol diagram of an embodiment of a method for information exchange for wavelength management in ONU activation phase.
FIG. 3 is a schematic diagram of an embodiment of a ONU wavelength and wavelength tunability report physical layer operations, administration, and management (PLOAM) message.

FIG. 2 illustrates an embodiment of a method 200 for information exchange for wavelength management in ONU activation phase. The activation process may allow an inactive ONU (e.g., an ONU 120) to join operations on a PON (e.g., the PON 100). The ONU activation may include procedures such as burst profile or overhead learning, serial number assignment, and ranging (allocating time windows for transmission). The method 200 may allow the PON to support multiple wavelengths, e.g., to enable an OLT (e.g., the OLT 110) to communicate with multiple ONUs via multiple wavelengths. In order to support multiple wavelengths, the ONU wavelengths and wavelength tunability properties may be reported to the OLT. After making a wavelength assignment decision, the OLT may instruct the ONU to either maintain the current wavelength(s) or tune to the target wavelength(s). At step 201, the ONU may send an ONU wavelength and tunability report message to the OLT. At step 202, the OLT may send a wavelength assignment command to the ONU (to maintain or change the ONU's wavelength(s)). At step 203, the ONU may send back an ONU response to the OLT.

The ONU may have one or two working wavelengths. In the case of two working wavelengths, one of the wavelengths may correspond to downstream transmissions from the OLT to the ONU, and another wavelength may correspond to upstream transmissions from the ONU to the OLT. In the activation process, the working wavelengths of an inactive ONU may be a random pair of wavelengths or a default pair of wavelengths, e.g., depending on the ONU's transmitter/receiver (transceiver) design and the PON protocol specification. After learning the burst profile, the ONU may report its current configured wavelengths and wavelength tunability to the OLT.

In an embodiment, the ONU wavelength and tunability report message (in step 201) above may be sent via a new PLOAM message or by modifying a currently used PLOAM message to carry this information. FIG. 3 illustrates an embodiment of an ONU wavelength and wavelength tunability report PLOAM message 300 that may be used to carry this information from the ONU to the OLT. The message 300 may be sent by an inactive ONU to the OLT as a portion of a response to a serial number grant from the OLT. Alternatively, the message 300 may be sent by the ONU after receiving an Assign_ONU-ID PLOAM message from the OLT.

The ONU wavelength and wavelength tunability report PLOAM message 300 be a new PLOAM message for the XGPON and GPON protocols. The PLOAM message 300 may comprise about 9 fields, which may have a total size of about 48 octets. The fields and corresponding sizes are shown in FIG. 3 (w, x, y, and z are integers). The ONU wavelength and wavelength tunability information in the message 300 may include an unassigned or assigned ONU-ID (at octets 1 to 2), a message type ID (at octet 3), a sequence number (at octet 4), an ONU Tx wavelength (at octets 5 to w), an ONU Rx wavelength (at octets w+1 to x), ONU Tx tunability (at octets x+1 to y), ONU Rx tunability (at octets y+1 to z), reserved or padding bits (at octets z+1 to 40), and a message integrity check field (at octets 41 to 48).

FIG. 4 illustrates an embodiment of a Serial_Number_ONU PLOAM message 400 that may also be used to carry the ONU wavelength and wavelength tunability information from the ONU to the OLT. The message 400 may be a modified Serial_Number_ONU PLOAM message for the GPON protocol. The Serial_Number_ONU PLOAM message 400 may comprise about 12 fields, which may have a total size of about 48 octets. The fields of the Serial_Number_ONU PLOAM message 400 shown in FIG. 4 may be configured as defined in the GPON protocol. However, some of the fields or bits may be modified to exchange the ONU wavelength and wavelength tunability information. Specifically, the bits in octets 17 to w (w is an integer) may be used for indicating the ONU Tx wavelength, the bits in octets w+1 to x (x is an integer) may be used for indicating the ONU Rx wavelength, the bits in octets x+1 to y (y is an integer) may be used for indicating the ONU Tx tunability, and the bits in octets y+1 to z (z is an integer) may be used for indicating the ONU Rx tunability.

After receiving the ONU report (in step 201), the OLT may make a wavelength assignment decision for the corresponding ONU. Relevant factors of determining the wavelength assignment of a new ONU may include the overall wavelength capability of the PON system, wavelength tunability of ONUs, network traffic load among ONUs, tuning cost and tuning time, and/or other relevant network conditions. The OLT may then send a wavelength assignment command to the ONU (in step 202). The wavelength assignment command may be sent via a new PLOAM message or a modified existing PLOAM message.

FIG. 5 illustrates an embodiment of a wavelength assignment PLOAM message 500 that may be used to carry the wavelength assignment information from the OLT to the ONU. The wavelength assignment PLOAM message 500 may be a new PLOAM message for the XGPON and GPON protocols. The message 500 may be sent from the OLT to an inactive ONU after sending an Assign_ONU-ID PLOAM. However, if the ONU's working wavelengths match the assigned wavelengths by the OLT, there may be no need to transmit the wavelength assignment PLOAM message 500.

The wavelength assignment PLOAM message 500 may comprise about 7 fields, which may have a total size of about 48 octets. The fields and corresponding sizes are shown in FIG. 5 (a and b are integers). The wavelength assignment information in the message 500 may include an assigned ONU-ID (at octets 1 to 2), a message type ID (at octet 3), a sequence number (at octet 4), an ONU Tx wavelength (at octets 5 to a), an ONU receiver Rx wavelength (at octets a+1 to b), reserved or padding bits (at octets b+1 to 40), and a message integrity check field (at octets 41 to 48).

FIG. 6 illustrates an embodiment of an Assign_ONU-ID PLOAM message 600 that may also be used to carry the wavelength assignment information from the OLT to the ONU. The message 600 may be a modified Assign_ONU-ID PLOAM message for the GPON protocol. The Assign_ONU-ID PLOAM message 600 may comprise about 10 fields, which may have a total size of about 48 octets. The fields of the Assign_ONU-ID PLOAM message 600 shown in FIG. 6 may be configured as defined in the GPON protocol. However, some of the fields or bits may be modified to exchange the wavelength assignment information. Specifically, the bits in octets 15 to a (a is an integer) may be used for indicating the ONU Tx wavelength, and the bits in octets a+1 to b (b is an integer) may be used for indicating the ONU Rx wavelength.

The ONU may tune its wavelengths to match the assigned wavelength from the OLT if the assigned wavelengths sent from the OLT are different from the ONU's working (or currently configured) wavelengths. After the tuning process, the ONU's transceiver may be configured with the assigned wavelengths, and the ONU may send back a response to the OLT (in step 203). The response may indicate the tuned wavelengths from the ONU (e.g., according to the wavelength assignment of the OLT). The response may be a new PLOAM message or a modified existing PLOAM message.

FIG. 7 illustrates an embodiment of a wavelength response PLOAM message 700 that may be sent by the ONU after tuning to the assigned wavelengths. The wavelength response PLOAM message 700 may comprise about 7 fields, which may have a total size of about 48 octets. The fields and corresponding sizes are shown in FIG. 7 (a and b are integers). The information in the message 700 may include an assigned ONU-ID (at octets 1 to 2), a message type ID (at octet 3), a sequence number (at octet 4), an ONU Tx wavelength (at octets 5 to a), an ONU Rx wavelength (at octets a+1 to b), reserved or padding bits (at octets b+1 to 40), and a message integrity check field (at octets 41 to 48).

FIG. 8 illustrates an embodiment of a Registration PLOAM message 800 that may also be used to indicate the tuned wavelengths from the ONU to the OLT. The message 800 may be a modified Registration PLOAM message for the GPON protocol. The Registration PLOAM message 800 may comprise about 7 fields, which may have a total size of about 48 octets. The fields of the Registration PLOAM message 800 shown in FIG. 8 may be configured as defined in the GPON protocol. However, some of the fields or bits may be modified to exchange the wavelength information. Specifically, the bits in octets a+1 to b (a and b are integers) may be used for indicating the ONU Tx wavelength, and the bits in octets b+1 to 40 may be used for indicating the ONU Rx wavelength.

FIG. 9 illustrates an embodiment of an Acknowledge PLOAM message 900 that may also be used to indicate the tuned wavelengths from the ONU to the OLT. The message 900 may be a modified Acknowledge PLOAM message for the GPON protocol. The Acknowledge PLOAM message 900 may comprise about 8 fields, which may have a total size of about 48 octets. The fields of the Acknowledge PLOAM message 900 shown in FIG. 9 may be configured as defined in the GPON protocol. However, some of the fields or bits may be modified to exchange the wavelength information. Specifically, the bits in octets 6 to a (a is an integer) may be used for indicating the ONU Tx wavelength, and the bits in octets a+1 to b (b is an integer) may be used for indicating the ONU Rx wavelength.

The ONU response sent back to the OLT (in step 203) may be optional (e.g., during the ONU activation process) if the ONU is enabled with full wavelength tunability. In the case of supporting partial wavelength tunability, the ONU response may be used to notify the actual wavelengths which the ONU can use. The indicated wavelengths may be the best effort by the ONU with its limited tunability and may or may not match the wavelengths assigned by the OLT.

Figure 10:
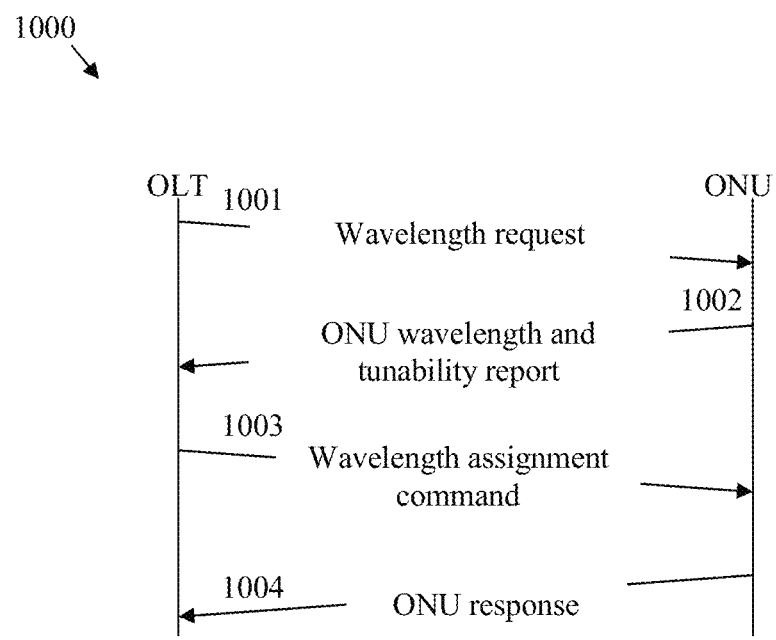
FIG. 10 is a protocol diagram of another embodiment of a method for information exchange for wavelength management in ONU activation phase.

FIG. 10 illustrates an embodiment of another method 1000 for information exchange for wavelength management in ONU activation phase. Using the method 1000, the OLT may initiate the communications with the ONU for wavelength management for the ONU by sending a wavelength request to the ONU. At step 1001, the OLT may send a wavelength request to the ONU to inquire about the wavelength and tunability information for the ONU. At step 1002, the ONU may send an ONU wavelength and tunability report message to the OLT. At step 1003, the OLT may send wavelength assignment command to the ONU (to maintain or change the ONU's wavelength(s)). At step 1004, the ONU may send back an ONU response to the OLT. The different messages in the method 1000 may be configured similar to the corresponding messages in the message 200.

During regular or normal operations of the ONU, e.g., after the ONU's activation, the OLT may request from the ONU to change its wavelength(s). One reason for changing or retuning the ONU's wavelength may be to balance PON traffic among the available wavelengths. For example, in a WDM-TDM hybrid PON system, the ONUs may be equipped with tunable transceivers. If some wavelengths are heavily loaded while other wavelengths are (relatively) lightly loaded or idle, retuning some of the ONUs from the heavily loaded wavelengths into other wavelengths may be advantageous.

Figures 11, 12:
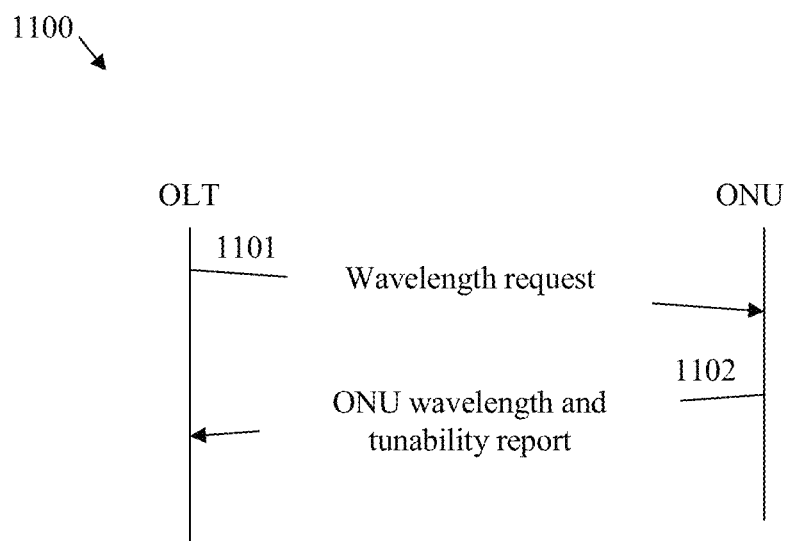
FIG. 11 is a protocol diagram of an embodiment of a method for information exchange for wavelength capability request and report in ONU operation phase.
FIG. 12 is a schematic diagram of an embodiment of a Request wavelength PLOAM message.

FIG. 11 illustrates an embodiment of a method 1100 for information exchange for wavelength capability request and report in ONU operation phase to support wavelength management. During the ONU's normal operations, the OLT may optionally send a wavelength request to the ONU. The ONU may in return report its working wavelengths and its tunability back to the OLT. Based on this information exchange, the OLT may confirm the ONU working wavelengths. Such information also helps the OLT to make the wavelength retuning decision. At step 1101, the OLT may send a wavelength request to the ONU, e.g., to inquire about the ONU's working wavelengths and tunability. At step 1102, the ONU may return an ONU wavelength and tunability report to the OLT.

The wavelength capability request and report information of the method 1100 may be exchanged using PLOAM messages or via an ONT management and control interface (OMCI) channel. For instance, the ONU report message (in step 1102) may be a PLOAM message configured similar to the ONU wavelength and wavelength tunability report PLOAM message 300 or the Serial_Number_ONU PLOAM message 400.

FIG. 12 illustrates an embodiment of a Request wavelength PLOAM message 1200 that may be used to request the working wavelength(s) and tunability from an ONU (in step 1101). The Request wavelength PLOAM message 1200 may be a new PLOAM message for the XGPON and GPON protocols. The message 1200 may be sent from the OLT to an active ONU during operation, e.g, after the ONU's activation. The Request wavelength PLOAM message 1200 may comprise about 5 fields, which may have a total size of about 48 octets. The fields and corresponding sizes are shown in FIG. 12. The fields in the message 1200 may include an assigned ONU-ID (at octets 1 to 2), a message type ID (at octet 3), a sequence number (at octet 4), reserved or padding bits (at octets 5 to 40), and a message integrity check field (at octets 41 to 48). The message type ID may have a value that indicates a wavelength request message.

FIG. 13 illustrates an embodiment of a Request_Registration PLOAM message 1300 that may also be used to request the working wavelengths and tunability from an ONU (in step 1101). The message 1300 may be a modified Request_Registration PLOAM message for the GPON protocol. The Request_Registration PLOAM message 1300 may comprise about 11 fields, which may have a total size of about 48 octets. The fields of the Request_Registration PLOAM message 1300 shown in FIG. 13 may be configured as defined in the GPON protocol. However, some of the fields or bits may be modified to indicate a wavelength request message. Specifically, the bits in octets 15 to 5 (a is an integer) may be used for indicating that the message is for wavelength information request. The messages 12 and 13 that are used in the method 1100 may also be used in the method 1000 above.

FIG. 14 is a schematic diagram of an embodiment of a plurality of management entity (ME) attributes 1400 for wavelength capability request and report. The ME attributes 1400 may be OMCI ME attributes that may be used to exchange the wavelength information in the method 1100 via an OMCI channel. The attributes and their description are shown in FIG. 14. The ME attributes 1400 may indicate a working upstream frequency for the ONU, a working downstream frequency for the ONU, workable upstream frequencies of the ONU, and workable downstream frequencies for the ONUs. The working upstream frequency attribute may specify the ONU's current upstream signal frequency (for transmitting data to the OLT), e.g., in gigahertz (GHz). This attribute may be a read/write (R,W) attribute, may be optionally sent, and may have a size of about 4 bytes. The working downstream frequency attribute may specify the ONU's current downstream signal frequency (for receiving data from the OLT), e.g., in GHz. This attribute may be a read/write attribute, may be optionally sent, and may have a size of about 4 bytes. The workable upstream frequency attribute may specify the ONU's available (or tunable) upstream signal frequencies, e.g., in GHz. The workable downstream frequency attribute may specify the ONU's available (or tunable) downstream signal frequencies (for transmissions from the OLT), e.g., in GHz. In other embodiments, the ME attributes 1400 for wavelength capability request and report may indicate wavelength values (e.g., in nanometers) instead of frequency values (e.g., in Hertz), or other values such as wavelength IDs.

During the ONUs operations, the OLT may decide to change or shift the communication channel (e.g., wavelength channel) with a corresponding ONU. When the OLT decides to shift the channel into different wavelength(s), the OLT may indicate the new assigned wavelength(s) to the ONU by sending a wavelength change command. Accordingly, the ONU may convert its wavelength(s) to the target wavelength(s) indicated by the OLT's command. After tuning its transceiver, the ONU may send a response to confirm the completion of wavelength change or retuning.

Figures 15, 16:
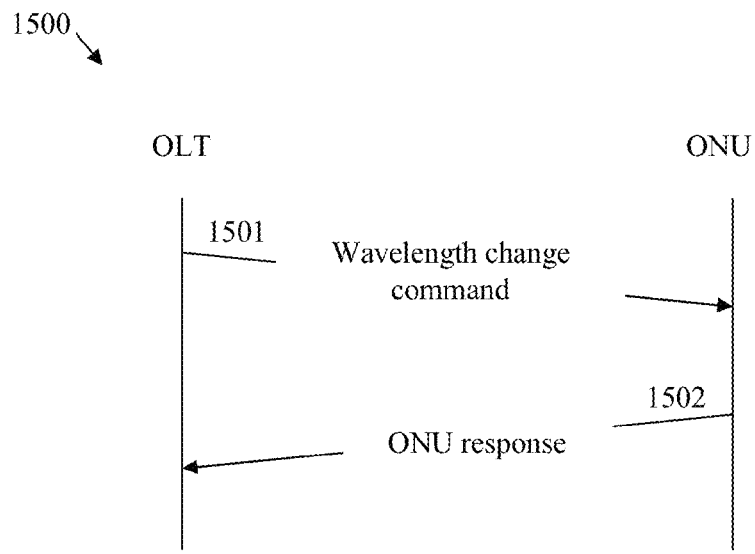
FIG. 15 is a protocol diagram of an embodiment of a method for information exchange for wavelength change in ONU operation phase.
FIG. 16 is a schematic diagram of an embodiment of ME attributes for wavelength change command.

FIG. 15 illustrates an embodiment of a method 1500 for information exchange for wavelength change in ONU operation phase to support wavelength management. At step 1501, the OLT may send a wavelength change command to the ONU, e.g., to request a change in the ONU's working wavelengths to match the shift in communications channel by the OLT. At step 1502, the ONU may return an ONU response, e.g. to acknowledge the change in the ONU's wavelength(s) or indicate otherwise.

If the ONU tunes to new wavelength(s), the ranging time (e.g., the transmission window in time) may be different from the ONU original ranging time. Typically, the tolerated threshold for the drift of time window may be sufficient to overcome this issue. The ONU response may be optional if the ONU is enabled with full wavelength tunability (e.g., to cover all the requested wavelengths from the OLT). In the case of supporting partial wavelength tunability, the ONU response (in step 1502) may notify the OLT of the actual wavelengths the ONU can reach or use. These indicated wavelengths may be the best effort by the ONU with its limited tunability.

The wavelength information for wavelength change in the method 1500 may be exchanged using PLOAM messages or via an OMCI channel. For instance, the PLOAM message for the OLT wavelength change command (in step 1501) may be sent via a PLOAM message similar to the wavelength assignment PLOAM message 500 or the modified Assign_ONU-ID PLOAM message 600. The PLOAM message for the ONU response (in step 1502) may be sent via a PLOAM message similar to the wavelength response PLOAM message 700 or the modified Registration PLOAM message 800.

FIG. 16 is a schematic diagram of an embodiment of a plurality of ME attributes 1600 for wavelength change command or request. The ME attributes 1600 may be OMCI ME attributes that may be used to exchange the wavelength information in the method 1500 via an OMCI channel. The attributes and their description are shown in FIG. 16. The ME attributes 1600 may indicate a target upstream frequency (or wavelength) for the ONU and a target downstream frequency (or wavelength) for the ONU. The target upstream frequency (or wavelength) attribute may specify the frequency (or wavelength) of the converted upstream signal transmitted by the ONU, e.g., in GHz. This attribute may be a read/write (R,W) attribute, may be optionally sent, and may have a size of about 4 bytes. The target downstream frequency (or wavelength) attribute may specify the frequency (or wavelength) of the converted downstream signal received by the ONU, e.g., in GHz. This attribute may be a read/write attribute, may be optionally sent, and may have a size of about 4 bytes.

Figure 17:
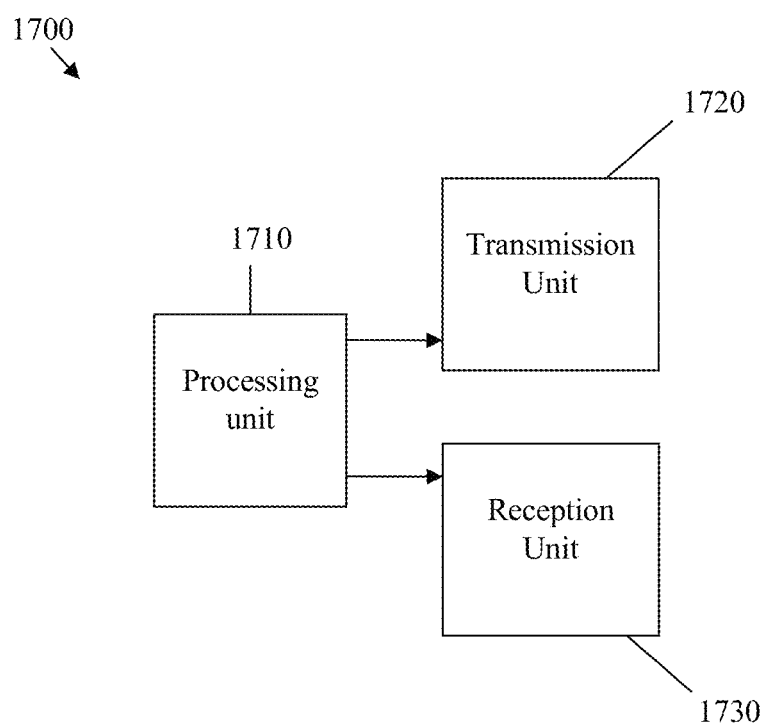
FIG. 17 is a schematic diagram of an embodiment of an apparatus configured to implement a PON wavelength management method.

FIG. 17 illustrates an embodiment of an apparatus 1700 that may be configured to support or implement the wavelength manage methods above. The apparatus 1700 may comprise a processing unit 1710, a transmission unit (or transmitter) 1720, and a reception unit (or receiver) 1730 that may be configured to implement or support the methods 200, 1000, 1100, 1500, or combinations thereof. The apparatus 1700 may be located at an OLT and may implement the portions of the methods that correspond to the OLT. Alternatively, the apparatus 1700 may be located at an ONU and may implement the portions of the methods that correspond to the ONU. The processing unit 1710, the transmission unit 1720, and the reception unit 1730 may correspond to hardware, firmware, and/or software installed to run hardware. The processing unit 1710 may be configured to process the wavelength management messages above (e.g., PLOAM messages and/or OMCI attributes) according to the implemented wavelength management method. The transmission unit or transmitter 1720 may be configured to transmit the associated messages or frames (e.g., at the MAC layer), and the reception unit or receiver 1730 may be configured to receive the associated messages or frames.

Figure 18:
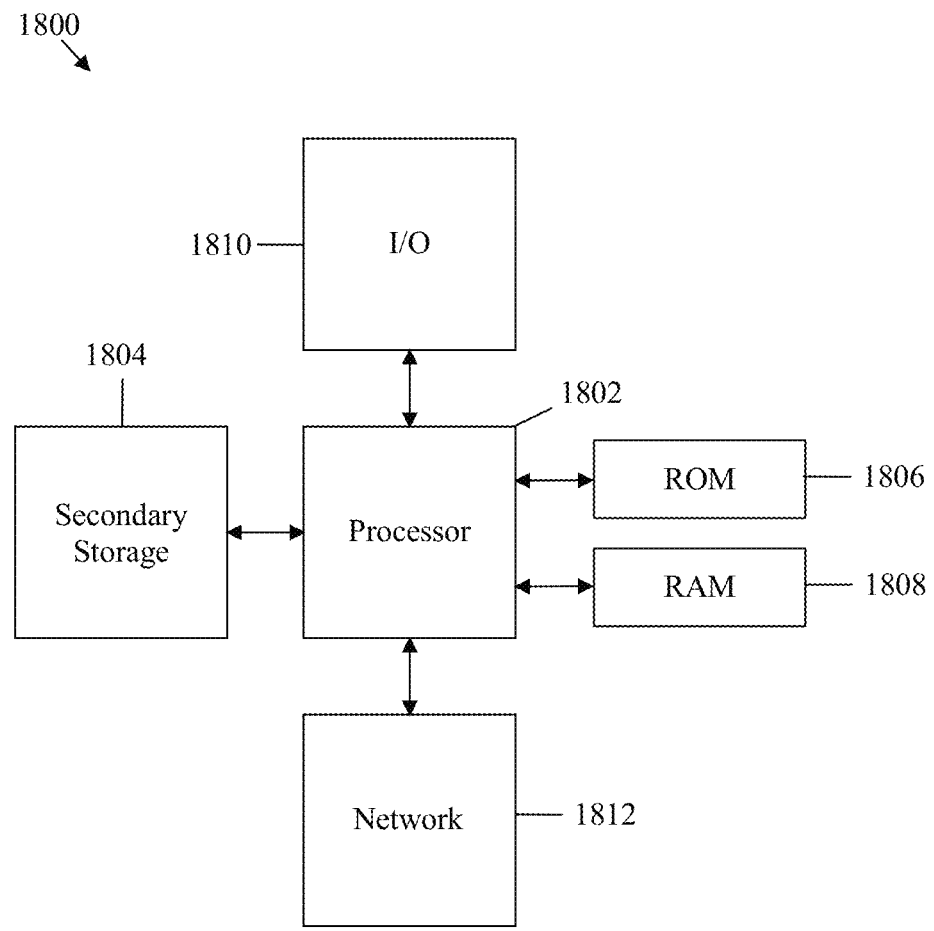
FIG. 18 is a schematic diagram of an embodiment of a general-purpose computer system.

The components and methods described above may be implemented using any general-purpose network component (at the OLT or ONU), such as a computer or network component with sufficient processing power, memory resources, and network throughput capability to handle the necessary workload placed upon it. FIG. 18 illustrates a typical, general-purpose network component 1800 suitable for implementing one or more embodiments of the components and methods disclosed herein. The network component 1800 may include a processor 1802 (which may be referred to as a central processor unit or CPU) that is in communication with memory devices including secondary storage 1804, read only memory (ROM) 1806, random access memory (RAM) 1808, input/output (I/O) devices 1810, and network connectivity devices 1812. The processor 1802 may be implemented as one or more CPU chips, or may be part of one or more application specific integrated circuits (ASICs).

The secondary storage 1804 is typically comprised of one or more disk drives or tape drives and is used for non-volatile storage of data and as an over-flow data storage device if RAM 1808 is not large enough to hold all working data. Secondary storage 1804 may be used to store programs that are loaded into RAM 1808 when such programs are selected for execution. The ROM 1806 is used to store instructions and perhaps data that are read during program execution. ROM 1806 is a non-volatile memory device that typically has a small memory capacity relative to the larger memory capacity of secondary storage 1804. The RAM 1808 is used to store volatile data and perhaps to store instructions. Access to both ROM 1806 and RAM 1808 is typically faster than to secondary storage 1804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented at an optical line terminal (OLT) to support wavelength management for a passive optical network (PON) comprising:
   receiving, using a receiver, a wavelength and tunability report in a Serial_Number_optical network unit (ONU) physical layer operations, administration, and management (PLOAM) message, wherein the wavelength and tunability report is received from an ONU, wherein the wavelength and tunability report comprises data that indicates an ONU transmitter wavelength, an ONU receiver wavelength, an ONU transmitter tunability, and an ONU receiver tunability, and wherein the ONU transmitter tunability and the ONU receiver tunability each comprise a plurality of wavelengths;
   sending, using a transmitter, a wavelength assignment command to the ONU in a Assign_ONU-ID PLOAM message, wherein the wavelength assignment command indicates an assigned ONU transmitter wavelength and an assigned ONU receiver wavelength;
   exchanging a registration with the ONU; and
   exchanging a wavelength assignment change with the registered ONU in an operation phase subsequent to the registration.

2. The method of claim 1 further comprising receiving a response from the ONU after sending the wavelength assignment command, wherein the response is sent in a PLOAM message.

3. The method of claim 2, wherein the PLOAM message associated with the response is a Registration PLOAM message that indicates the assigned ONU transmitter wavelength and the assigned ONU receiver wavelength.

4. The method of claim 2, wherein the PLOAM message associated with the response is a Acknowledge PLOAM message that indicates the assigned ONU transmitter wavelength and the assigned ONU receiver wavelength.

5. The method of claim 1, further comprising sending a wavelength request to the ONU before receiving the wavelength and tunability report, wherein the wavelength request is sent in a PLOAM message.

6. The method of claim 5, wherein the PLOAM message associated with the wavelength request is a dedicated PLOAM message that comprises a message type identifier (ID) that indicates a wavelength request.

7. The method of claim 5, wherein the PLOAM message associated with the wavelength request is a Request_Registration PLOAM message that includes a wavelength request indication.

8. The method of claim 1, wherein exchanging the wavelength assignment change further comprises:

sending a wavelength change command to the ONU that indicates a second assigned ONU transmitter wavelength and a second assigned ONU receiver wavelength; and receiving a response that indicates a current ONU transmitter wavelength and a current ONU receiver wavelength.

9. The method of claim 8, wherein the wavelength change command is sent via a plurality of management entity (ME) attributes of an ONU management and control interface (OMCI) channel that indicate a target upstream wavelength and a target downstream wavelength.

* * * * *